Figure 4:
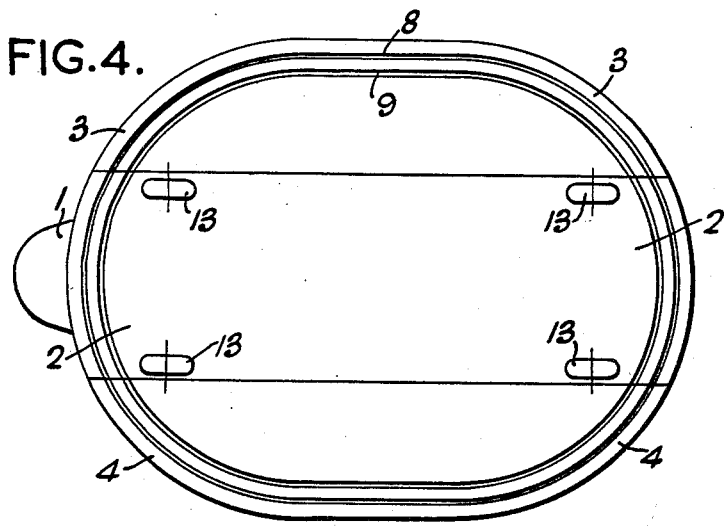

April 13, 1965 C. S. COCKERELL 3,177,960
VEHICLES FOR TRAVELLING OVER LAND AND/OR WATER
Filed March 7, 1961 2 Sheets-Sheet 1
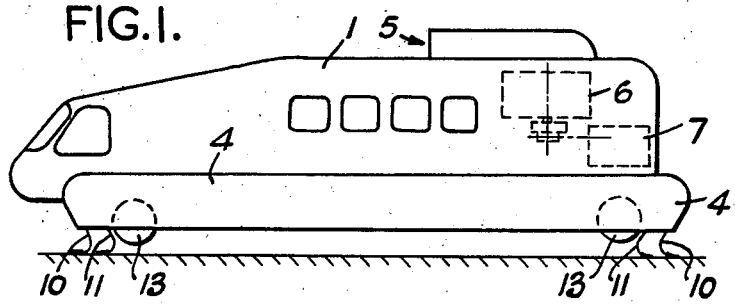
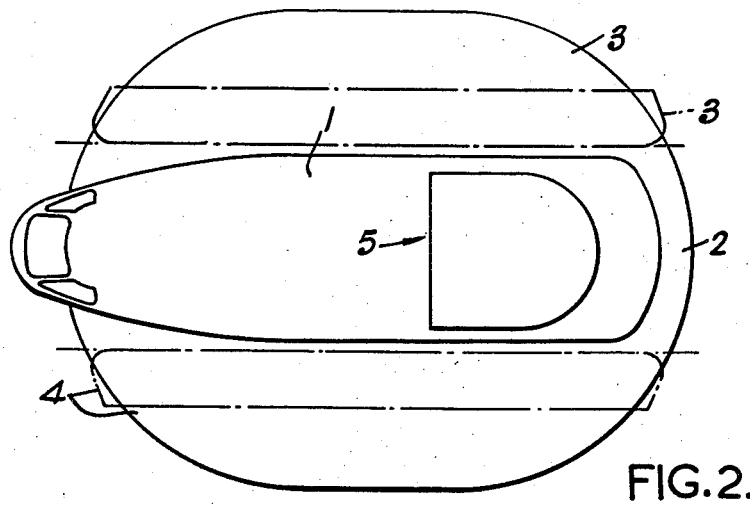
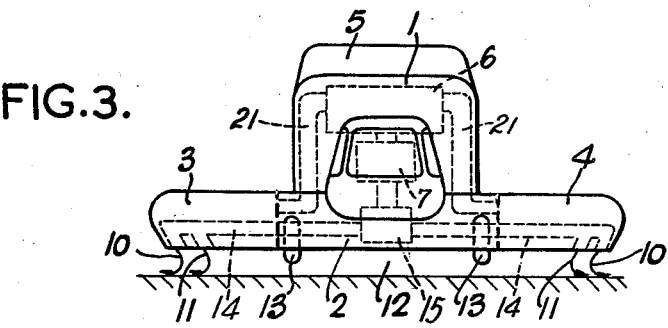
Inventor
C. S. COCKERELL
By Cameron, Kerkam & Sutton
Attorneys April 13, 1965   C. S. COCKERELL   3,177,960
VEHICLES FOR TRAVELLING OVER LAND AND/OR WATER
Filed March 7, 1961   2 Sheets-Sheet 2

Inventor
C. S. COCKERELL,
By Cameron, Kerkam & Sutton
Attorneys

United States Patent Office 3,177,960
Patented Apr. 13, 1965

3,177,960
VEHICLES FOR TRAVELLING OVER LAND
AND/OR WATER
Christopher Sydney Cockerell, Lymington, England, assignor to Hovercraft Development Limited, London, England, a British company
Filed Mar. 7, 1961, Ser. No. 93,912
Claims priority, application Great Britain, Mar. 9, 1960, 8,328/60
7 Claims. (Cl. 180—7)

This invention relates to vehicles for travelling over a surface, which are supported, at least in part, by a cushion of pressurised gas formed and contained beneath the bottom surface of the vehicle.

In such vehicles, the lift or load carrying capacity is proportional to the plan area of the gas cushion or cushions. The energy required to contain the cushion or cushions is proportional to the peripheral dimension of the cushion or cushions. Thus for an increase in size of a vehicle, the lift increases proportionally to the area of the cushion or cushions whilst the energy requirements increase linearly with the periphery of the cushion or cushions. The efficiency of a vehicle therefore increases with the plan area of the cushion or cushions, and hence with the plan area of the vehicle.

While such vehicles can travel over comparatively rough ground and over water, it may sometimes be convenient to propel them over metalled roads and to provide them with wheels for this purpose. Again it may be necessary to stow them on a carrier ship or carry them in other transport means. Further it may be desirable to store them away when not in use. The large plan area is a disadvantage when the vehicle is not being used for its normal purpose.

According to the invention there is provided a vehicle for travelling over a surface and provided with means which in operation are capable of producing and containing underneath the vehicle a pressurised cushion of gas by which the vehicle is at least partly supported, wherein at least part of the structure by which the cushion is contained is in the form of a hollow inflatable member extending laterally outwards from the main body of the vehicle so as to contribute to the overall ground plan area of the vehicle.

When used as a vehicle for conveying passengers, freight and the like the vehicle will normally comprise a rigid portion on which are mounted a power plant, compressor or compressors, a duct immediately surrounding the compressors and controls. Attached to the rigid portion are inflatable members which, when inflated, increase the plan area of the vehicle enabling it to operate over unprepared surfaces. According to a further feature of the invention therefore there is provided a vehicle for travelling over a surface provided with means which in operation are capable of producing and containing a pressurised cushion of gas underneath the vehicle by which the vehicle is at least partly supported and in which part of the cushion containing structure is in the form of one or more rigid members and in which the remainder of the cushion containing structure is in the form of one or more inflatable members.

For convenience the curtains and cushions will be considered as being air although other gases may be used.

Figure 5:
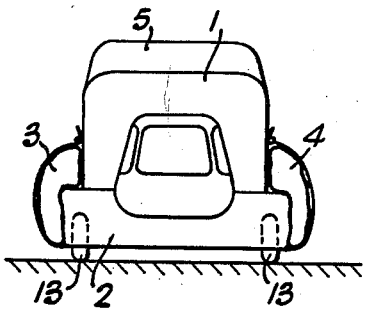
Figure 6:
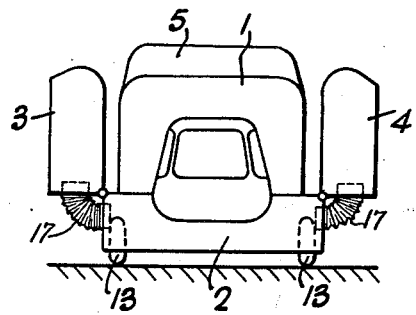
Figure 7:
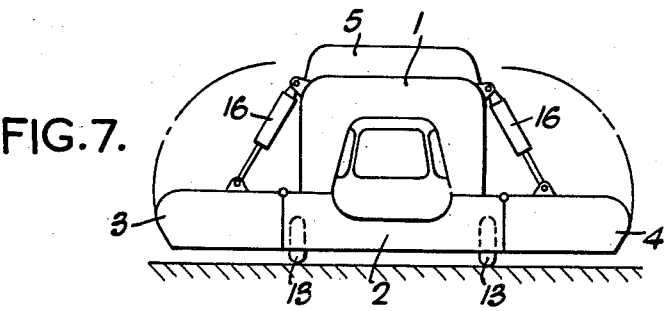

The invention will be readily understood by the following description of certain embodiments of the invention in conjunction with the accompanying drawings in which:

FIGURE 1 is a side elevation of a vehicle embodying the invention with its inflatable members inflated, in which air curtains partly contain the air cushion, FIGURE 2 is a plan view of the vehicle shown in FIGURE 1, FIGURE 3 is a front elevation of the vehicle shown in FIGURE 1, FIGURE 4 is an inverted plan view of the vehicle shown in FIGURE 1, FIGURE 5 is a front elevation of the vehicle shown in FIGURE 1 with the inflatable members deflated, FIGURE 6 is a front elevation of a vehicle similar to that shown in FIGURE 1 in which the inflatable members are folded upwards in an inflated condition, and FIGURE 7 is a diagrammatic vertical cross section showing a method of folding parts of the vehicle.

The vehicle illustrated in FIGURES 1 to 6 is of the form in which the cushion of air is formed and contained beneath the bottom surface of the vehicle by curtains of air formed from annular ports in the bottom surface. The vehicle has a central elongated body 1 carried on a base portion comprising a rigid centre section 2 and inflatable side sections 3 and 4. The body 1 has a forward facing air intake 5 for supplying air to a compressor 6 driven by an engine 7. Formed in the bottom surface of the sections 2, 3 and 4 are two annular supply ports 8 and 9. The supply ports 8 and 9 may communicate directly with the interior of the inflatable sections 3 and 4, so that when air is admitted to the inflatable sections from compressor 6 through ducts 21 to extend them into their operating position, this air also issues from the supply ports to form air curtains. Alternatively, separate ducts 14 of flexible material may be formed inside the inflatable sections to supply air to the supply ports, as indicated in FIGURE 3.

FIGURE 3 shows the vehicle with the inflatable sections inflated and extended, air curtains 10 and 11 being formed by air issuing from the supply ports and forming and containing a cushion of pressurised air 12 beneath the bottom surface of the vehicle.

FIGURE 5 shows the vehicle with the inflatable sections deflated and stored against the sides of the centre section 2 and body 1. Wheels 13 are attached to the rigid centre section and the vehicle can travel over prepared surfaces.

In operation, the vehicle is transported, by being driven along a road, for example, or carried on a ship or other carrier, with the inflatable sections deflated and stored as in FIGURE 5. The overall width of the vehicle is much reduced and can conform with maximum dimensions allowed or available. When it reaches the location where, for example, prepared tracks are not available or where other surface conditions, e.g., sand, mud, water, do not permit the use of wheeled vehicles the inflatable sections are extended. This is done by the compressor 6 forcing air into the inflatable sections which then inflate, taking up a position as shown in FIGURE 3. Curtains of air are formed by air issuing from the supply ports 8 and 9. As described above, the air forming the air curtains beneath the inflatable sections may be the same air as inflates the inflatable sections or may be supplied separately through the ducts 14 from a second compressor 15 also driven by the engine 7. The portions of the supply ports formed in the bottom surface of the rigid centre section are fed with air from the compressor 6 by ducts positioned either in the centre section 2 or in the body 1. After the inflatable sections have been inflated, the air curtains issuing from the supply ports 8 and 9 formed in sections 2, 3 and 4 cooperate to form and maintain a cushion of air beneath the vehicle, the cushion supporting the vehicle over the surface. The wheels 13 may be made to partly or wholly retract, once the air cushion is in being.

The vehicle can be propelled, when supported by the air cushion, by varying the efflux angle of the curtain forming air by means of vanes positioned in the supply ports. Alternatively, other means of propulsion such as air propellers may be used. When the vehicle is travelling on its wheels, the wheels may be driven by the engine 7 which drives the compressor 6, suitable clutching means being provided between the engine and the wheels and the compressor. Alternatively, a separate engine may be provided for driving the wheels.

Where it may be required to temporarily reduce the overall dimensions of the vehicle, this can be done, without deflating the inflatable sections, by attaching them to the centre section by means of hinges and folding the sections upwards as shown in FIGURE 6, in which case accordion type ducts 17 may be provided for supplying air to the inflatable sections 3 and 4 from the centre section. Extending and retracting of the inflated sections can then be done by various means. FIGURE 7 illustrates diagrammatically one such means for extending and retracting the inflated sections. Hydraulic jacks 16 attached at one end to the body 1 and at the other end to the inflated sections 3 and 4 extend and retract the inflated sections.

The vehicle illustrated in FIGURES 1 to 6 has its air cushion subdivided into an inner primary cushion and an outer annular secondary cushion by the provision of the two air curtains 10 and 11. A vehicle with only a single non-divided cushion has limited stability, being stable at low heights. By forming a secondary cushion, the pressure of which varies from the primary cushion, the stability of the vehicle can be improved. The pressure of the secondary cushion is normally intermediate that of the primary cushion and atmospheric pressure. The stability can be still further improved by dividing the secondary cushion into sections.

I claim:

1. A vehicle for travelling over a surface comprising a main body of rigid load-supporting construction, at least one hollow inflatable member connected to said main body, means for inflating said inflatable member, said member being so connected to said main body as to extend laterally outwards therefrom when inflated, means for forming a cushion of pressurised gas beneath the vehicle by which the vehicle is at least partly supported above the surface over which it operates, said cushion extending beneath both said main body and said inflatable member when inflated so that said cushion is partly contained by, and the pressure thereof acts on, the inflated member in supporting the vehicle, and additional means for supporting said main body above the surface when said member is deflated.

2. A vehicle as claimed in claim 1 including means for sub-dividing the space occupied by the cushion of pressurised gas.

3. A vehicle for travelling over a surface comprising a main body of rigid load-supporting construction, at least one hollow inflatable member connected to said main body, means for inflating said inflatable member, said member being so connected to said main body as to extend laterally outwards therefrom when inflated, and means for forming a cushion of pressurised gas beneath the vehicle by which the vehicle is at least partly supported above the surface over which it operates, said cushion extending beneath both said main body and said inflatable member when inflated so that said cushion is partly contained by, and the pressure thereof acts on, the inflated member in supporting the vehicle, said cushion forming means including means in the underside of the inflatable member for forming at least one curtain of fluid which travels across the gap that in operation exists between said surface and the structure of the vehicle.

4. A vehicle as claimed in claim 3 including separate means for supplying the fluid for inflating the inflatable member and for supplying the fluid for the curtain forming means.

5. A vehicle for travelling over a surface comprising a main body of rigid load-supporting construction, a pair of hollow inflatable members connected to said main body, means for inflating said inflatable members, said members being so connected to said main body as to extend laterally outwards therefrom when inflated, means for forming a cushion of pressurised gas beneath the vehicle by which the vehicle is at least partly supported above the surface over which it operates, said cushion extending beneath both said main body and said inflatable members when inflated so that said cushion is partly contained by, and the pressure thereof acts on, the inflated members in supporting the vehicle, and additional means for supporting said main body above the surface when said members are deflated.

6. A vehicle for travelling over a surface comprising a main body of rigid load-supporting construction, at least one hollow inflatable member connected to said main body, means for inflating said inflatable member, said member being so connected to said main body as to extend laterally outwards therefrom when inflated, means for forming a cushion of pressurised gas beneath the vehicle by which the vehicle is at least partly supported above the surface over which it operates, said cushion extending beneath both said main body and said inflatable member when inflated so that said cushion is partly contained by, and the pressure thereof acts on, the inflated member in supporting the vehicle, and wheels connected to said main body for supporting the latter above the surface when said member is deflated.

7. A vehicle for travelling over a surface of the type which is adapted to be supported, at least in part, by a cushion of pressurised gas formed and contained beneath the bottom surface of the vehicle, comprising a body having a rigid centre section and a pair of inflatable side sections connected to said centre section and extending outwardly therefrom on opposite sides thereof, means for inflating said inflatable sections, means including supply ports formed in the undersides of said rigid centre and inflatable side sections operable when said inflatable sections are inflated for forming at least one fluid curtain which travels across the gap that exists between the surface over which the vehicle is operating and the structure of the vehicle, which curtain surrounds and contains the cushion of pressurised gas by which the vehicle is at least partly supported, and means mounted on said rigid centre section for supporting the vehicle when the inflatable sections are deflated.

References Cited by the Examiner

UNITED STATES PATENTS

| 2,322,790 | 6/43 | Cristadoro. |
| 2,645,436 | 7/53 | Brown _____ 180—7 |
| 3,039,550 | 6/62 | Beardsley _____ 180—7 |

FOREIGN PATENTS

| 1,238,499 | 7/60 | France. |

OTHER REFERENCES

"Design News," May 23, 1960, pages 6 and 7.

A. HARRY LEVY, *Primary Examiner.*

GEORGE HYMAN, JR., *Examiner.*